United States Patent

Chisholm

[15] 3,705,404
[45] Dec. 5, 1972

[54] AIRCRAFT CLOCK MONITORING AND TIME PROPAGATING

[72] Inventor: John P. Chisholm, P. O. Box 2122, Olympic Valley, Calif. 95730

[22] Filed: Nov. 17, 1969

[21] Appl. No.: 877,188

[52] U.S. Cl..................343/112 R, 343/7.5, 343/103, 343/112 CA, 343/112 TC
[51] Int. Cl...............................................G01s 5/04
[58] Field of Search......343/112 R, 112 TC, 112 CA, 343/103, 7.5

[56] References Cited

UNITED STATES PATENTS

| | | | |
|---|---|---|---|
| 3,419,865 | 12/1968 | Chisholm | 343/112 |
| 2,972,742 | 2/1961 | Ross | 343/112 TC |

Primary Examiner—Benjamin A. Borchelt
Assistant Examiner—Richard E. Berger
Attorney—Alexander & Dowell

[57] ABSTRACT

A synchronized clock time sharing method and system for navigation and collision avoidance, including multiple fixed position units and multiple mobile units participating by exchange of signals therebetween with reference to their positions in two time propagation grids one comprising families of hyperbolic time difference curves and the other comprising polar coordinate curves. The units use these curves and their transmissions and their various positions in the grids to monitor each other's clocks and/or establish position in the grid of a selected unit.

16 Claims, 3 Drawing Figures

Fig.1

INVENTOR.
JOHN P. CHISHOLM
BY
Alexander & Dowell
ATTORNEYS.

AIRCRAFT CLOCK MONITORING AND TIME PROPAGATING

This invention relates to navigation and collision avoidance systems (CAS) of the type employing accurately synchronized time clocks in both mobile units and fixed position units, and more particularly relates to methods and means for monitoring the accuracy of the clocks and for propagating time among the various units.

Although this invention has utility with respect to various kinds of mobile units, such as land vehicles, marine craft or aircraft, the aircraft problems are of particular interest at the present time, especially in view of the great effort to improve their navigation, stationkeeping and collision avoidance capabilities. The Air Transport Association of America has specified a system in which there will be a network of ground station units all very accurately synchronized to a system-wide or worldwide time base to which the mobile units will then be synchronized by exchange of pulse signals with nearby synchronized units, for instance in a manner as taught by Minneman U.S. Pat. No. 2,869,121, Graham U.S. Pat. No. 3,183,504 or Michnik and Reinagel U.S. Pat. No. 3,336,591, etc. Once synchronized the aircraft use one-way pulse ranging techniques to determine their ranges to other fixed and mobile units to determine their positions and also the liklihood of mutual collision. Time sharing using uniquely occupied time slots is particularly helpful not only because it identifies the units occupying the slots and separates their transmissions, but also because it permits one-way ranging techniques, as distinguished from round-trip radar type ranging, and thereby reduces the density of pulses on the air and the lengths of the time slots used in the system so that more time slots may be provided in a given repeating cycle.

Clock synchronizing techniques, for example for collision avoidance as well as other uses, have been well developed as of the present time and operate quite successfully. Nevertheless, there is always the possibility that an occasional CAS unit equipped with a synchronized clock will fall out of synchronization as a result of some failure, and therefore will become a menace to itself and to other units by providing false indications and/or a false sense of security. For this reason it is highly desirable that there be some independent method by which other units can monitor the correctness of the various time clocks participating in the system-wide time base.

It is a principal object of this invention to provide a clock monitoring system which does not require the cooperation of the units being monitored in order to check the accuracy of their clocks. The present system merely assumes that the monitored units will continue to transmit their own pulse groups at predetermined moments in their uniquely occupied time slots, and that the listening stations, usually fixed-position stations, will then be able to monitor the accuracies of the clocks simply by reception of their pulse signals.

A corollary object of this invention is not only to monitor mobile unit clocks, but also to provide information to the mobile units by which their alignments may be improved. The present invention is not concerned with the particular type of indication of error to the mobile units, which indication can be provided either verbally, as part of the format for exchanging information between mobile and fixed units, or corrections may be indicated to the mobile unit by suitable telemetry means perhaps during the unit's own time slot where time slots are used.

Still another object of the invention is to provide a system in which mobile aircraft or other high-altitude units such as weather balloons and satellites can participate cooperatively with suitable fixed position ground units to establish the locations within a propagation time grid of other ground units which are out of line-of-sight contact with well synchronized ground units whose locations within the grid are established, thus making it possible to spread the time base to those remote ground units. The term "propagation time grid" as used herein is to be distinguished from a geographical grid because propagation time rather than distance is of chief concern in this disclosure.

In most instances in the prior art, it has been assumed that the ground units can somehow acquire mutual synchronization to a very high degree of accuracy without particular difficulty. This is certainly true in cases where the ground units are substantially within line of sight of each other so that the propagation of times between them can be accurately measured using roundtrip radar type measurements. However, this is sometimes not the case, for instance, where there is an intervening mountain chain, or where the distances between groups of ground units are too great, such as where there are large intervening bodies of water or uninhabited areas of land. In cases of this sort, transmissions between ground stations cannot be directly and conveniently exchanged in such a way as to accurately determine the signal propagation time between the units. The above-mentioned patent to Minneman suggests the use of an aircraft as a relay link between two ground stations that are out of direct contact with each other in order to synchronize their mutual clocks. The present invention is broadly similar to the extent that aircraft participate in exchanges between stations, but it is considerably simpler than the Minneman system from the point of view of equipment complexity.

According to the present invention, in many areas on the surface of the earth there will be plural ground station units all of which are accurately synchronized to the system-wide time, or are becoming synchronized thereto as will be described in greater detail hereinafter. The geographical locations of these stations are fixed, although three or more of the stations in at least one group are assumed to be within line of sight communication with each other, or have by some means established an accurate common time base and occupy precisely determined positions in the propagation time grid. As mentioned above, these propagation time grids are to be distinguished from geographical distance grids, for instance as proposed in U.S. Pat. No. 2,972,742 to Ross. The Ross patent is concerned with the physical location of the aircraft, and therefore its grid is laid out in terms of physical distances from the stations using hyperbolic curves. In the present invention, actual geographic locating of the aircraft is of no particular interest, but the checking of its time clock is of special interest, and therefore the grids used in the present disclosure are propagation time grids involving at least three units having known positions in the grids which relate both differences in times of arrivals of transmitted signals at these units and also absolute propagation times to at least one of these units. Knowing these two relationships simultaneously makes it possible to determine the accuracy of the mobile unit's clock. For present purposes, the fixed-position units are linked to computers which are common to the various groups.

The times of arrival of mobile unit pulses at the various ground stations are transmitted to the computer by the receiving units and the computer then determines, by solving hyperbolic equations based on the differences in times of arrival, the location of the transmitting mobile unit in the hyperbolic grid which is a time difference grid whose foci are the locations of the fixed receiving units. Having determined a time difference location of a mobile unit, the computer can determine the actual propagation time in microseconds from the mobile unit to one of the fixed units using a polar-coordinate grid, and knowing the actual propagation time, it can calculate the time according to that fixed unit's time clock when the mobile unit transmitted its signal. Thus, by noting the differences in times of arrival of a pulse as determined by at least three fixed stations, the system can proceed to determine the propagation time between the aircraft and any one of the ground stations and therefore the moment of transmission by that aircraft according to ground station system-wide time.

The aircraft is assumed to have transmitted its pulse at a predetermined moment according to its own time clock in the time slot which it occupied, and therefore a comparison can be made between the moment of actual transmission as determined above using the ground station's clock, and the moment of actual transmission of the signal according to the aircraft's own time clock. The difference between the two is a direct measure of the aircraft's clock error, and the aircraft can then be informed of this error either by word of mouth, or by some telemetry scheme, which may even automatically correct the aircraft's clock.

Another application to which the present invention is well adapted involves extending synchronization from a first well synchronized group of ground stations to a second group of ground stations including one or more stations which are located remotely and not well synchronized but have been located in the time grid. Assume that the stations in the second group can receive the pulse of an aircraft which is accurately synchronized to the time base of the first group, even though they are out of direct communication with the fixed position stations in the first-mentioned group. Since the second group stations have been located in the time grid, they can also use the grid to determine any discrepancies in their own clock readings as compared with the accurately clocked pulse transmissions being received from the aircraft. In other words, the position of the monitored aircraft in the propagation time grid which includes all ground stations is known, and therefore the transmission time from the aircraft to the remote and perhaps lesswell synchronized ground stations is determinable, and therefore the time at which the pulse from the monitored aircraft arrives at a group-two station provides information for correcting the remote station's clock to match the time base at the first group stations. By this means, system-wide time synchronization can be spread among ground stations or groups thereof through aircraft which are in radio contact with both groups by monitoring the times of arrival of their pulses at the various stations. Similarly, remote ground stations, whose positions in the propagation time grid system have not yet been established, can be located in the grid using several aircraft whose positions in the time grid are known and whose synchronized clocks are being accurately monitored by the unlocated ground stations to determine the propagation times of the aircraft signals to the nonlocated ground stations to determine the latters' coordinates in the propagation time grid.

These points will be discussed in greater detail hereinafter, and other objects and advantages of the invention will become apparent during the following discussion of the drawings, wherein.

Figure 1:
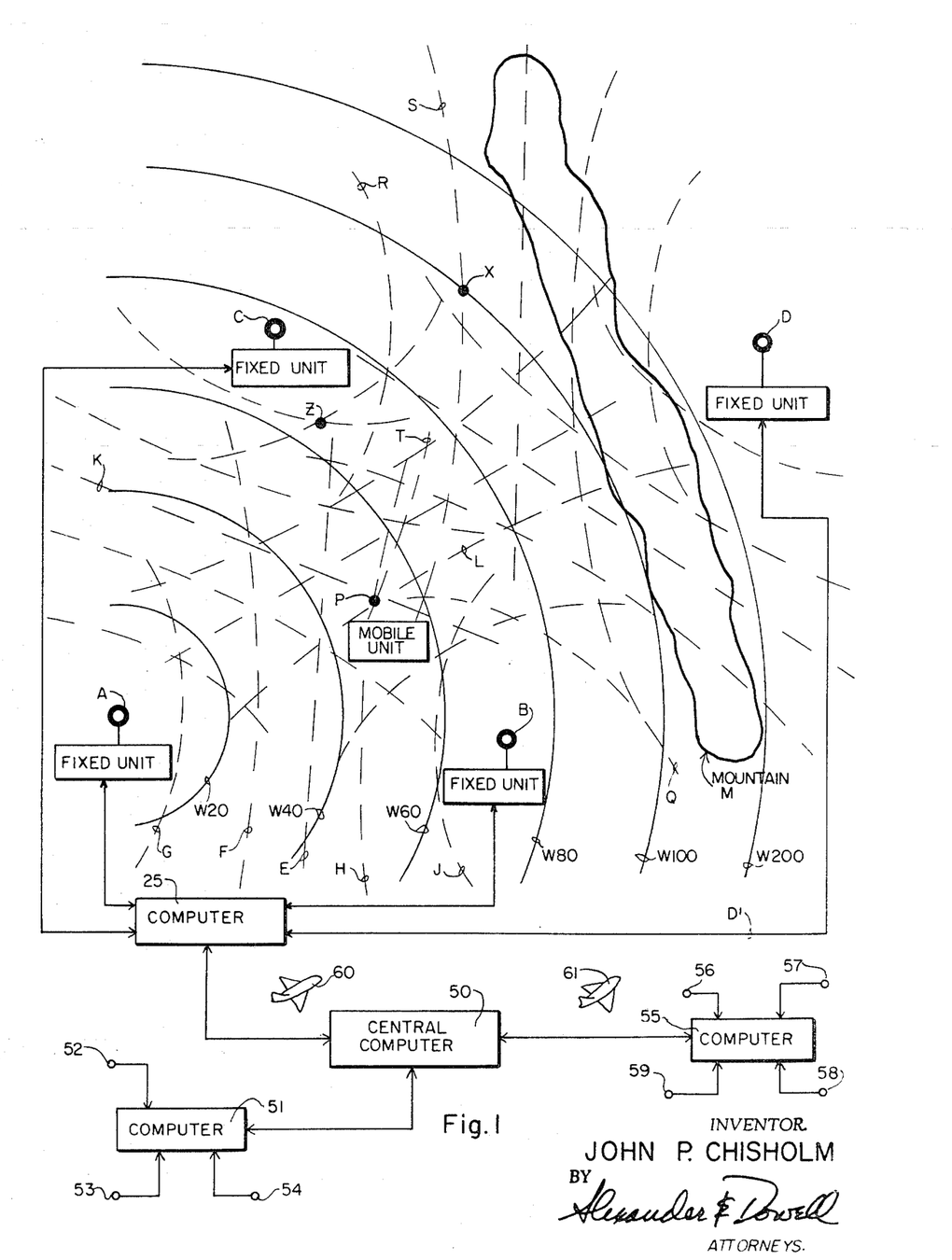
FIG. 1 is a view showing a plurality of fixed and mobile units located on a propagation time grid and on a time-difference grid of hyperbolic coordinates, one of the fixed units being located out of line-of-sight communication and on the other side of a mountain from the other fixed units.

Referring now to the drawings, FIG. 1 shows four fixed position units A, B, C and D, with a mountain chain M intervening between three of the units and the fixed unit D. A time-difference grid is drawn in such a way as to show a few of the hyperbolic lines of constant time difference between all of the fixed units, which become the foci of the families of curves shown on the diagram. For instance, as between the fixed unit A and the fixed unit B, there is a grid line E, which comprises a straight line disposed midway between the units such that the propagation time of a signal transmitted by any mobile unit lying upon this line will arrive at the same time at both units A and B, whereby the line E represents the zero-time-difference locus between the units. If it is assumed that stations A and B are geographically 12 miles apart, the line E will pass between the stations six miles from each and will be located at its nearest point roughly 36 microseconds from each station on the time grid. For illustrative purposes, as an approximation it will be assumed herein that the propagation time is 6 microseconds per mile. The line F is located nearer the station A than the station B and at its nearest point is 24 microseconds from the station A and 48 microseconds from the station B. Therefore, the line F represents a 24 microsecond difference in travel time of the signal of any aircraft located on the line F and transmitting to the stations A and B. The line G is located at its nearest point 12 microseconds from station A and 60 microseconds from the station B, and therefore represents 48 microseconds difference in travel time of a signal transmitted by an aircraft located anywhere on line G to the station B as compared with the propagation time to the station A. The line H is similar to the line F but represents the reverse case in which signals propagated by a mobile unit on the line H will arrive at the B station 24 microseconds before they arrive at station A. Similarly with respect to an aircraft located on the line J, its transmitted pulse signals will arrive at the B station 48 microseconds earlier than the signals will arrive at the station A.

These hyperbolic curves are only representative of a very much larger number of curves that would be placed upon a practical time-difference grid. A similar family of hyperbolic curves has been drawn between the various other fixed units shown in FIG. 1, and although these units happen to be shown roughly the same distance apart in FIG. 1, it is to be understood that the spacings between fixed units are selectable variables. The hyperbolic curves are actually surfaces, but can be considered as lines if the ground unit spacings are great as compared with the altitudes at which the aircraft fly in the area under consideration. In the present example, a mobile unit P is assumed to be located in the grid between the stations, for instance on the hyperbolic line H and approximately on the straight line K bisecting the distance between the stations A and C, and on the line L which represents a difference of 24 microseconds in transit time for a signal travelling to station B and to station C. The position of the mobile unit P with respect to the fixed unit D lies upon the hyperbolic line Q so that its signal will arrive at the B station 48 microseconds sooner than it will arrive at the fixed unit D. However, with respect to the fixed units C and D, the position of the mobile unit P is a little less than half way between the lines R and S, and since the line R represents a 48 microsecond earlier arrival at C than D, and the line S represents a 24 microsecond earlier arrival at the station C than D, it appears that the point P is so located that it will lie upon approximately a 30 microsecond hyperbolic grid line T. Thus, the position of the mobile unit P as illustrated in the drawing results in the above stated relative times of arrival of its transmission at the four fixed units, which times of arrival are all clearly determinable from the hyperbolic grid.

In setting up the time grid shown in FIG. 1, the propagation times between the various fixed units can be very accurately determined, especially where the units are in line of sight with each other. These propagation times can be determined, for example using conventional round-trip propagation time measuring means in which one station transmits a signal to another ground station, which then replies, for instance by transponder to the first station, the overall propagation time between the stations then being determined by dividing the elapsed time in half after subtracting known system delays. Once determined, the propagation time remains substantially constant except for very small variations occurring as the result of changes in air density. Such variations are of the order of a few nanoseconds and will be ignored for present purposes.

Figure 2:
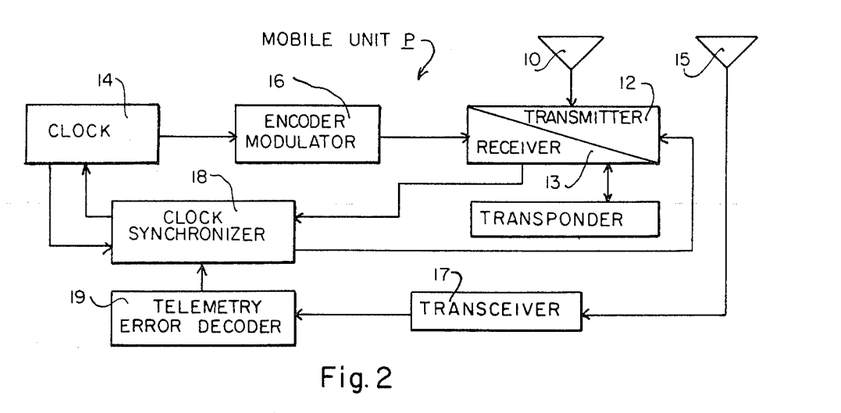
FIG. 2 is a block diagram of a system carried by a mobile unit equipped to participate in the present scheme.

It will be recalled that one of the objects of the present invention as stated above is to provide a monitoring system by which mobile unit clocks can be monitored without requiring any participation by the mobile unit in the monitoring system except to the extent that the mobile unit broadcasts its own pulse signals from time to time which are received by the fixed units to determine the correctness of the mobile unit's clock setting. FIG. 2 shows a typical mobile unit P having an antenna 10 connected to a pulse transmitter 12 and pulse receiver unit 13 of suitable type. The aircraft also includes the local time clock 14 which serves to initiate predetermined moments of transmission of the unit's own pulse signals as encoded by an encoder 16 which then triggers the transmitter, all as well known in the prior art. The receiver 13 and the transmitter 12 both form part of a suitable clock synchronizing system including a clock synchronizer 18 of any suitable variety, such as the one shown in the Michnik/Reinagel U.S. Pat. No. 3,336,591 mentioned above. This unit cooperates with a synchronizer 22 in at least one ground station such as the ground station A shown in FIG. 3 to periodically reset the time clock in the mobile unit P, the system as described to date comprising essentially the clock synchronizing system set forth in the Air Transport Association Specification, mentioned above and similar to the said Michnik and Reinagel scheme, or to such a scheme as that suggested in the patent to Graham U.S. Pat. No. 3,183,504.

Figure 3:
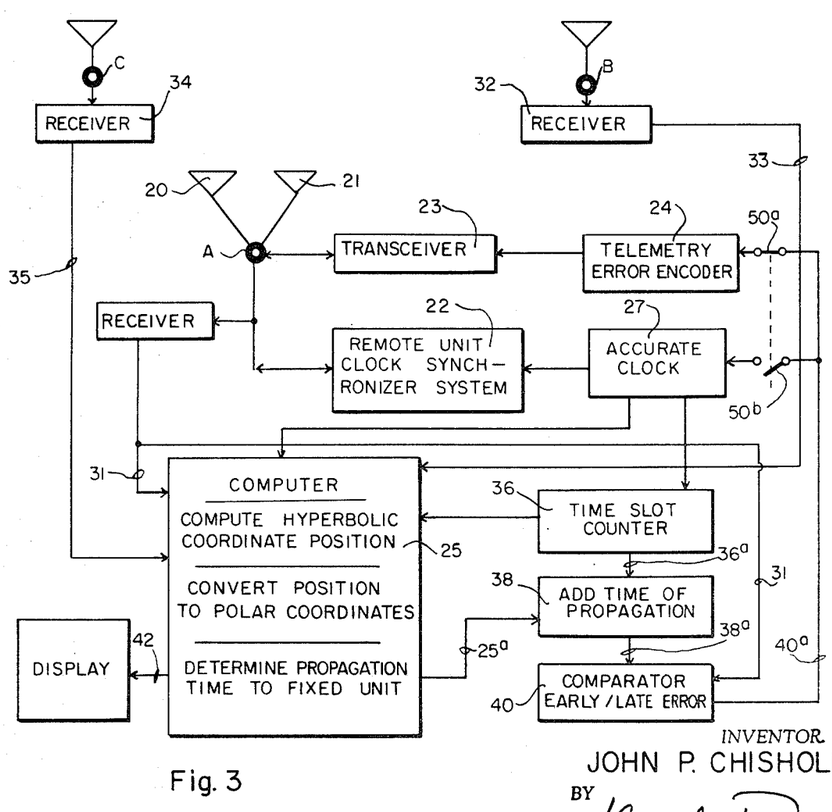
FIG. 3 is a block diagram showing a typical array of fixed positioned units connected with a common computer.

It is assumed that the fixed unit A includes more than simply a listening receiver, and that it includes an antenna 20 and a mobile-unit synchronizing system 22 which forms the ground counterpart of the normal clock synchronizing system which is assumed to already exist. The ground unit A and the mobile unit P are also assumed to have a mutual communication system including in the mobile unit the antenna 15 and a transmitter 17, and including in the ground unit A the antenna 21 and a communications transceiver 23, all of standard type. In a practical installation, a single antenna may be used in the mobile unit to take the place of the dual antennas 10 and 15, and the same probability also applies to consolidation of the ground unit antennas.

The items described to date are assumed to be standard in a synchronized clock system, and it is to these standard units that the present invention adds. Note, however, that it is not necessary that any of the ground units under discussion have the capability of actually synchronizing airborne clocks, since the present disclosure is concerned mainly with monitoring of the airborne clocks. However, synchronizing capability is illustrated since it would probably exist in at least some of the ground station units in a practical system.

As pointed out above, the normal time clock systems in the mobile units, and the synchronizing systems linking mobile and fixed units maintain synchronization of the mobile unit's clocks to the system-wide time base, which is assumed in the ATA specification to be worldwide. However, since it is possible for the time clock in a particular mobile unit, or possibly even in a fixed unit to fall out of synchronization while the personnel operating the unit are unaware that its synchronization has slipped outside of permissable limits, this invention therefore provides a nonparticipating monitoring system by which the time clocks in the various units are continuously monitored so that any errors in their clocks will be detected before the error has contributed to a possible accident. This monitoring is accomplished by detecting the differences in times of arrival of received signals at various fixed units such as the units A, B and C in FIG. 1, which differences then are used to determine the time grid position of the mobile unit P Time-of-Arrival systems are widely illustrated in the prior art, generally for the purpose of determining the position in space of the mobile unit, as distinguished from monitoring its time clock. The determination of the correctness of the aircraft time of transmission requires two grids and two computations based upon a hyperbolic propagation time-difference grid and a linear propagation time grid related to at least one ground station, such as the grid W20, W40, W60, W80, W100 as shown in FIG. 1. The mobile unit P is first located in the hyperbolic grid by a first computation solving hyperbolic equations to obtain position in the time grid using equations similar to those discussed in Ross U.S. Pat. No. 2,972,742 to determine geographical location. Another scheme which determines the geographical position of a mobile vehicle using hyperbolic time of arrival relationships solved by a computer is presented in my U.S. Pat. No. 3,419,865. Although in both of these patents the hyperbolic grid is a distance grid, still the equations to be solved and the computer techniques are similar. However, since it is time clock accuracy that is to be determined as distinguished from geographic location of the mobile unit, once the location of the latter in the hyperbolic time-difference grid has been determined, then the actual propagation time to the fixed unit A has then to be determined by locating the mobile unit P in the propagation time grid W. In the drawing the mobile unit appears to be a little more than halfway from the grid line W40 to the grid line W50, or at 51 microseconds from the ground unit A. Hence, by knowing the moment at which the signals from unit P were received at unit A and their travel time, it is easy to compute the moment when the unit P actually transmitted its signal according to the ground station clock at unit A.

In the present clock monitoring illustration, it is assumed that the mobile unit P has a synchronized time clock whose synchronization is acquired, for example, using the equipment described above in connection with FIGS. 2 and 3. Alternatively, the aircraft may even have an atomic clock which has been accurately synchronized before departure of the aircraft. At any rate, the aircraft will transmit its own encoded pulse signals at known predetermined moments in a repeating cycle of time slots, one of which is occupied by the mobile unit P. In the presently proposed worldwide time system including one-thousand-microsecond time slots uniquely assigned to the various aircraft, if the present aircraft occupies the time slot between 4,000 and 5,000 microseconds, its own time clock will be perfectly synchronized with ground station system wide time assuming that it transmitted at the beginning of its own time slot if the fixed unit A receives its pulse signal at time 004051 seconds in the cycle. Therefore, the reception of the mobile unit's pulse at this moment indicates perfect synchronism of the clock in the mobile unit with system-wide time, accurately kept by the ground unit A. On the other hand, if the signal arrives at time 004068, the indication is that the time clock in the mobile unit P is in error by 17 microseconds, and that it is slow. When such error has been determined, the local fixed unit A can then communicate the amount of error and its direction via its communication transceiver 23 and antenna 21, through the antenna 15 and communication transceiver 17 in the mobile unit P in order to inform it that its clock is in error, and perhaps to instruct it to correct such error, assuming for some reason that the main clock synchronizing units 22 and 18 have not already taken steps to make such corrections.

Referring to FIG. 3, the fixed units A, B, and C all have receivers 30, 32 and 34, respectively connected to suitable receiving antennas. When the mobile unit transmits its pulse signal, the latter is received at these locations and its relative times of arrival at the receivers are delivered to the computer 25 via the connecting links 31, 33 and 35, respectively. From this information, the computer first determines the hyperbolic time-difference grid coordinates of the mobile unit P by solving hyperbolic equations in a manner known in the prior art as discussed above. Then the computer 25 converts the hyperbolic coordinates of this point to a point in the polar coordinate time grid system W shown in FIG. 1, using the fixed station A as its center. After this conversion, the propagation time of the signal from the mobile unit P to the fixed unit A is known because this transit time is a coordinate. The equipment at the fixed unit A also includes a time slot counter 36 driven by the accurate clock 27 and delivering on the wire 36a the predetermined moment in each time slot at which a mobile unit occupying that slot, if any, should transmit its pulse signal if it is in perfect synchronization with the system wide time base. This signal is delivered to a variable delay circuit 38, which introduces a delay into the moment of transmission indication on wire 36a. This introduced delay is equal to the computed propagation time from unit P to ground unit A minus a fixed delay representing fixed system delays such as a delay introduced by the computer itself in making the determination. These introduced delays appear on the wire 38a and are controlled by the signal from the computer on wire 25a.

A comparator 40 receives the signals on the wires 38a and 31 and compares their instants of occurrence. Simultaneous occurrence means that the clock in the unit P is perfectly synchronized with the ground unit clock 27. If there is a substantial difference, however, the comparator 40 will issue an error signal on wire 40a which drives an error telemetry encoder 24 and delivers an "out-of-sync" signal via the transceiver 23, the transceiver 17, FIG. 2, and the error decoder 19 in the unit P. A display unit 42 may be overlaid with the grids shown in FIG. 1 and can be driven by the computer 25 to display the locations of various mobile units in that propagation time grid if so desired. The transceivers 17 and 23 may be either voice transceivers by which the operator of the mobile unit is instructed as to his clock error, or else they may comprise telemetry equipment 19 and 24 for indicating the error, perhaps even coupled with automatic equipment in the aircraft synchronizer 18 for making a suitable correction. At any rate, the precise manner in which the error information, once determined, is used forms no part of the present invention. The present invention is concerned with the provision of a monitoring system requiring no cooperation on the part of the mobile unit, and simply serving the purpose of checking to be sure that the mobile unit time clock does not develop a dangerous undetected error.

It is not necessary that the system wide time be divided into time slots in order to make the present system workable. It is only necessary for purposes of clock monitoring that the aircraft be required to transmit their pulse groups at predetermined moments in their own time bases and that they identify such moments, perhaps by encoding or telemetry. A time clock in a mobile unit accurately synchronized to a system wide time base can be used for many purposes other than collision avoidance. One such purpose would be navigational, i.e. one way range determining to ground stations which periodically transmit pulse groups accurately initiated at predetermined moments by ground station time clocks which are also synchronized to that system wide time base. In this event, time slots are unnecessary and the aircraft need not use their synchronized clocks to initiate their own transmissions, but only to determine the instants at which they receive ground station ranging pulses whose moments of transmission are known. Of course, the aircraft clocks should be periodically monitored and for this purpose it may be desirable to have the clock trigger aircraft transmissions and include therewith a message as to the local clock reading at the time of transmission and the identity of the aircraft. The ground unit would then check the clock time of the mobile unit with the system wide time after correcting for propagation time as described above, and using the hyperbolic time grid and the polar grid. In low traffic areas, the location of the mobile unit in the grids may sufficiently identify it.

Going back to the example employing time slots wherein each aircraft occupies a slot of known duration and position within the time cycle, this fact is of assistance, since it is no longer necessary for the aircraft to identify itself. It is sufficiently identified for present purposes by the time slot which it occupies. For instance, in the present example, the mobile unit is known to have transmitted its pulse at the beginning instant of the fourth time slot, at time 004000 according to its own time clock. Likewise, the aircraft occupying the 16th time slot will be known to have transmitted its pulse at time 016000, and therefore the pulse which arrives after that time in the 16th time slot belongs to that aircraft, and once the aircraft has its location determined in the propagation time grid of FIG. 1, the error of its clock with respect to the system wide time base of station A is easily determined. The present disclosure shows only fixed unit A as being equipped to synchronize the mobile units, but this is only a simplification of the expected practical scheme in which complete ground units would probably be located at airports and would have their own time clocks which would also be synchronized, as well as their own systems for synchronizing mobile units, such as the system designated by the reference character 22 in FIG. 3.

LOCATING REMOTE FIXED STATIONS

A further embodiment of my invention extends the present disclosure to perform the further function of locating within the propagation time grid one or more remote ground station units, especially those which are not within line-of-sight communication with the above discussed fixed units, as would be the case in connection with the fixed unit D which is located on the other side of a mountain M from the previously discussed synchronized ground units A, B and C. Assume that it has become desirable somehow to extend the grid to include a fixed unit D. As was pointed out above, units A, B and C were able to determine their relative propagation grid positions for instance by round trip transmission and transponder means, but only because they were within sight of each other. Where their separation is greater, another way of accomplishing this purpose is as shown in the reference Minneman which actually uses an aircraft to relay the signals back and forth between two ground stations so that they can effectively determine transit times and determine mutual locations by triangulation. Another cruder way is to use survey data and known geographic locations in order to permit calculation of the relative propagation times between ground unit D and the other fixed units A, B and C and thereby fix unit D in the grid system. A further possibility is to couple the ground stations together by wires and then measure the propagation times along the wires in order to obtain propagation time data, but this method does not directly establish their distances apart with regard to airborne signal propagation times. Nevertheless, the time grid must be established, and its successful establishment is provided for by the present disclosure as discussed below, without having to go through the expedient of determining geographic positions of the stations.

Actually, the locating of remote ground units in a common propagation time grid is more basic to the monitoring and the propagation of time throughout a system, than laying out a surveyed distance grid for the purpose of determining geographic locations as suggested in prior hyperbolic computation patents. Various schemes for establishing the propagation time grid have been mentioned in passing, including an adaption of Minneman's system, or the use of geographic surveyor's data to permit calculation and laying out of the time grid. However, the present modification of the invention makes it more practical than other methods of determining the location in the time grid of the fixed unit D by using a plurality of aircraft transmitting their signals from locations within the already established time grid including units A, B and C. These signals are transmitted from such altitudes as to be in line of sight contact with all of the ground stations involved.

Assume that there are two aircraft P and X as shown in FIG. 1 whose transmissions are assumed to be synchronized as in the above mentioned CAS system, or whose time of actual transmission is accurately known in the time base participated in by the fixed units A, B and C. Now these transmissions coupled with knowledge at the fixed unit D of the locations in the established time grid of these aircraft can produce data from which the fixed unit D can establish its position in the propagation time grid as follows: When the fixed unit D has corrected these received transmission to take account of the fact that they occurred at different times, the difference in times of transmission of the two signals will be eliminated, and they can then be treated as though they were transmitted at the same time. By subtracting the corrected time of arrival of one signal from the corrected time of arrival of the other signal according to the fixed unit D's own time clock, a time differential can be obtained which can be used to establish a point on a hyperbolic time difference curve at which the unit D is located and which curve uses the two positions of the two aircraft in the time grid as it foci. If the same step is repeated using other aircraft, or after waiting a few minutes for these same aircraft to move to different locations in the established portion of the time grid of units A, B and C, another hyperbolic curve can be established, again using the two positions of the two aircraft in the time grid. The intersection of this latter curve with the formerly established hyperbolic curve will locate the unit D on both curves. Repeating of the process will provide redundancy adequate to average out minor errors in individual measurements and accurately locate the unit D in the time grid of units A, B and C.

It is important to note that the clock at remote ground unit D need not be set or synchronized to the same time base as the units A, B or C in order to locate the unit D in the propagating time grid. This is true because the clock in unit D is only used to difference the times of arrival of the signals from the pairs of aircraft being received. A relatively simple clock suffices for this purpose, such clock comprising a counter driven by a crystal oscillator having an accuracy of about one part in ten to the sixth.

Thus, it can be seen that remote stations can be easily and accurately located in the propagation time grid by using the propagation time difference between signals received from two mobile unit transmitters which have themselves been located in the propagation time grid. The ability to thus locate a station in a time grid without using geographical coordinates is of importance in establishing stations in new areas where survey data may not be accurate or available, perhaps as may be the case in military situations.

PROPAGATING TIME AMONG FIXED STATIONS

A further embodiment of my invention extends to the spreading of a system wide time base among the various ground station units to keep the time base accurate thereat. Once a ground unit such as the unit D is located within the propagation time grid it then becomes necessary to synchronize its clock, such as the clock 27, with the clocks located in all of the other fixed units forming parts of the present system. In a practical system wide or worldwide network of synchronized fixed units, it is of course necessary to synchronize all of the clocks with respect to each other. It is another feature of the present invention that the system shown in FIG. 1 can be used for this purpose.

Extending the example described above, the mobile unit P occupies a position in the hyperbolic time difference grid as shown in FIG. 1 and as definitely determined by the three fixed units A, B and C. Further assume that this mobile unit P comprises an aircraft which transmits its own pulses and is also in direct radio communication with the fixed unit D on the other side of the mountain. For illustrative purposes, further assume that it is equipped with an air traffic control transponder which is a standard item on all aircraft which fly at commercial altitudes. This transponder is especially useful because its output is at relatively high power, about 1,000 watts, and its pulses have very short rise times, of approximately 100 nanoseconds which permit very accurate measurement of the pulse position in time. Moreover, the standard transponder has a digital coding capability which permits identification of the transponder pulse from any specific aircraft. It is especially helpful that at any particular hour of the day there are many hundreds of such aircraft carrying such transponders flying over the United States, and in fact over most parts of the world, and the present system conveniently proposes to use these aircraft transponders, or similar airborne transmitters, to assist the fixed units in checking their own time clock alignments with system wide time, again in a way requiring very minimal cooperation on the part of the various aircraft.

Assuming that the clock alignment in fixed unit D is to be checked against the clock time in fixed units A, B and C, and assuming that the aircraft P has line-of-sight contact with all four ground stations, the precise time at which the pulse group was transmitted from the aircraft P, as measured in the time base of the fixed units A, B and C is known, as described above in detail. Additionally, the location of the aircraft P in the overall time grid is known, as determined above by finding the intersections of the hyperbolic lines of equal time difference and using the intersection of these curves to determine the aircraft position in the polar propagation time grid W. Moreover, the location in the time grids of the remote station D is now known as determined above by the used plural aircraft flying therewithin. By reference to FIG. 1 it will be seen that the fixed station unit D is also connected to the computer 25 by line D which should be considered to be a multiple-communication link through which the unit D can deliver times of arrival to the computer of signals transmitted by the mobile units. This link can also deliver from the computer to station D indications of its clock error, and indications that a particular identified aircraft is in fact fully synchronized and therefore can be used to accurately propagate worldwide time to the station D.

If the position of the transmitting aircraft in the time grid is communicated to unit D, it can then determine on wire 25a of FIG. 3 when it should have received the aircraft pulse according to the time base used by stations A, B and C. It also notes on wire 31 the time at which it did in fact receive the pulse group according to its own time clock. The difference in these two times, if any, as determined by the comparator 40 shows the ground unit D the sense and magnitude of the error of its own clock on wire 40a with respect to the time base to which the units A, B and C are synchronized. The switches 50a and 50b can be used to switch the fixed unit of FIG. 3 between synchronizing itself by correcting its clock and synchronizing other units by correcting theirs. Thereby the time is propagated from the stations A, B and C to synchronize the station D, and all that was required of the aircraft itself was the identified transmission of its synchronized pulse signal. The components shown in FIG. 3 in connection with unit A can function to serve unit D in a similar manner since they serve to determine the difference between aircraft clock time and local ground unit clock time, the only difference being that when used as just stated with reference to unit D these components would be used to correct the unit D clock rather than the aircraft clock, which is assumed to be fully synchronized.

It is therefore apparent that aircraft or other vehicles having means for transmitting identifiable pulse signals can be used to locate remote stations or groups of stations in a propagation time grid and to establish, spread, and monitor worldwide time, where groups of stations are linked to local computers which in turn may be linked to a common central computer. Referring to FIG. 1 the computer 25 which serves the fixed units A, B, C and D is linked to a central computer 50, which in turn is linked with other computers serving other remote groups of fixed units, the computer 51 serving fixed units 52, 53 and 54, and the computer 55 serving fixed units 56, 57, 58 and 59 with interconnections similar to those shown in FIGS. 1 and 3 and relating to fixed units A, B, C and D. Although these groups of stations are too remote from each other to have line-of-sight transmission contact with one another, high flying aircraft 60 and 61, and others not shown in FIG. 1, can propagate time among these groups of fixed units in the manners set forth above and maintain the system wide time base with great accuracy and redundancy. The concept of linking computers to a central data processing computer is intended to include not only land wiring, but also radio links, perhaps through satellites to span large bodies of water. The central computer 50 is useful in making the necessary hyperbolic computations involving fixed units which are located in two different groups and which are both communicating with aircraft flying high enough to exchange pulse signals directly with both groups so that mutual synchronization among the groups can be attained.

It is assumed that eventually hundreds of such ground stations will be installed across a country the size of the United States, and located within appropriate time grids, and since even at minimal traffic hours there will be hundreds of commercial aircraft distributed among these stations, it will be common practice to continuously monitor the clock settings of even the more remotely located aircraft and/or ground stations.

While the above discussion has focused in detail on aircraft and fixed units on the surface of the ground, it should be noted that the fixed units may advantageously include weather-ships in the ocean or even slow moving ships in the ocean. The fact that the ships are moving does not destroy their utility to aid in the clock monitoring function, providing their correct momentary location in the time propagation grid is known at all times for use in the computations. In a similar manner an aircraft can carry the equipment of FIG. 3 and perform the functions described above in connection with fixed stations while moving. This might be useful in extending the propagation time grid to remote overseas areas not yet covered by satellites. Actually, the mobile transmitting units need not be aircraft but can be vehicles such as trucks or boats or even underwater vessels. In the marine use of the invention it may be desirable to use pulsed acoustic transmissions rather than radio frequency transmissions.

The discussion above has been primarily concerned with propagation in the 1,000 to 2,000 KMHz band, which includes the ATC transponder and the CAS system. Of course, other frequency bands can also be utilized. For accuracies which are of interest here, of the order of 20 nanoseconds, propagation velocity as a function of altitude can be readily compensated for by a simple computation. The altitude of the aircraft is already known because routine transmissions from the aircraft probably include an altitude reporting code, for instance in CAS systems.

Having disclosed and described several embodiments of my invention, I now set forth the following claims.

I claim:

1. In a system including multiple fixed units and at least one mobile unit, said fixed units having time clocks substantially synchronized to a system wide time base and each mobile unit having means for transmitting pulse signals from time to time, the combination of means for determining the times at which the mobile units transmit their pulse signals without requiring cooperation from the mobile units beyond the occasional transmission of their pulse signals, comprising:

a. at least three fixed units spaced apart and located in a geographical area and forming the foci of coordinate hyperbolic grids representing the loci of points having constant differences in signal propagation times to the foci, and at least one of said fixed units forming the center of a polar coordinate grid of propagation times to at least that one fixed unit;

b. receiver means at said fixed units for receiving said pulse signals; and c. common computer means connected to said receiver means and responsive to the relative times of arrivals of said signals to locate a point in said hyperbolic time grid representing the position of the transmitting mobile unit, and said computer means being operative using said point and said polar time grid to determine the time according to the clock within said one fixed unit when the mobile unit transmitted its signal.

2. In a combination as set forth in claim 1, both the fixed units and the mobile units having time clocks substantially synchronized to said system wide time base, and said mobile units having means for transmitting said pulse signals and information indicating the times at which said signals were transmitted according to the mobile unit's time clock.

3. In a combination as set forth in claim 2, means for comparing the time of transmission of a mobile unit pulse signal as determined according to the clock within one fixed unit with the time of transmission of the signal as indicated according to said information based upon the mobile unit's time clock to determine the accuracy of synchronization of that time clock with respect to the clock in said one fixed unit.

4. In a combination as set forth in claim 3, communication means between the fixed unit associated with the polar time grid and said mobile units and operative for instructing the mobile units when their own clocks are determined to be inaccurate.

5. In a combination as set forth in claim 3, said communication means including clock error telemetry means.

6. In a combination as set forth in claim 1, both the fixed units and the mobile units having time clocks substantially synchronized to said system wide time base, said base including a repeating cycle of time slots occupied by the mobile units, and the mobile units respectively including means to transmit their pulse signals at predetermined moments in the slots known to all participating units.

7. In a combination as set forth in claim 6, means for comparing the time of transmission of a mobile units pulse signal as determined by said computer means with said predetermined moment at which the mobile unit transmitted the signal according to its own clock to determine the accuracy of the latter clock.

8. In a combination as set forth in claim 7, communication means between the fixed unit associated with the polar time grid and said mobile units and operative for instructing the mobile units when their own cycles are determined to be inaccurate.

9. In a combination as set forth in claim 8, said communication means including clock error telemetry means.

10. In a combination as set forth in claim 1 and including at least two mobile units, means for locating a fourth fixed unit with respect to the grids established by said at-least-three other fixed units and said fourth fixed unit being coupled to said common computer means, comprising means at the fourth fixed unit for receiving the mobile unit's transmitted pulse signals; means including said computer means and said other fixed units for determining the positions in the hyperbolic grids said at-least-two mobile units and for informing said fourth fixed unit of their positions; means operative at the fourth fixed unit for determining time differences relative to the propagation of the pulse signals from said located mobile units to said fourth fixed unit; and said computer means including means using at least two thus-determined time differences to locate the fourth unit in the grid.

11. In a combination as set forth in claim 1 and including at least one mobile unit whose position in said grids has been determined and whose times of transmission have been determined in the time base of said at-least-three other fixed units and including a remote fourth fixed unit which is coupled to said computer means and whose position in the grids is known, means for synchronizing the fourth unit's clock with the time base to which said other fixed units are synchronized comprising, means at the fourth fixed unit for receiving the mobile unit's transmitted pulse signal; means including said computer means for determining the actual time of arrival of the received signal according to the fourth unit's clock time, for computing when the pulse signal should arrive at the fourth unit according to its position in said grids and the time base of the three fixed units, and for computing the error in the clock at the fourth unit by comparing said actual time of arrival with said computed time of arrival; and means for correcting the fourth fixed unit's clock to eliminate such error.

12. In a combination as set forth in claim 11, said fourth fixed unit and said common computer means including means for extending said coordinate grid of hyperbolic curves using as foci said other fixed units and said fourth fixed unit by establishing additional grids representing the loci of points having the same differences in propagation times as between said fourth fixed unit and other fixed units.

13. In a combination as set forth in claim 1, at least two groups of fixed units each group having its own common computer means, and the respective computer means being coupled to a central computer serving the several groups, and the time grids of adjacent groups having areas overlapping each other whereby mobile units operating in the overlapping areas can have their clocks monitored by either group, and means for propagating the time base from one group to another comprising means in the latter group from synchronizing its local time base to that of a mobile unit synchronized to the former time group.

14. The method of determining the time of transmission of a pulse signal from a mobile unit to a selected fixed unit which is one of at least three fixed units having clocks synchronized to a common time base, including the steps of transmitting a pulse signal from the mobile unit and receiving it at the fixed units, locating the mobile unit by computer-solving simultaneous hyperbolic relationships based on differences in times of arrival of said signal at said fixed units, computer-converting this location into polar coordinates extending from the selected one of said fixed stations to determine travel time of the pulse signal thereto, and correcting the actual time of arrival at the selected fixed station of said signal by said travel time to determine the actual time of transmission by the mobile unit.

15. The method of locating in a system of hyperbolic time difference grids whose foci comprise multiple ground station units a remote fixed unit whose position with respect thereto is unknown but which is coupled to computer means shared in common with said ground station units, including the steps of navigating multiple mobile units within said grids and in direct communication with said ground stations and said fixed unit; synchronizing said ground stations and mobile units to a common time base; transmitting accurately timed pulse signals from the mobile units and receiving said signals at the ground stations and at said fixed unit; computer calculating the locations of said mobile units in said hyperbolic grids using differences in the times of arrival of their pulse signals at said ground stations; and computer calculating the position in said time difference grids of said fixed unit by using the differences in times of arrival of at the fixed unit of the pulses from the mobile units using their known positions as foci to establish hyperbolic relationships and extending said grids to include said fixed unit.

16. The method of synchronizing a time clock in a fixed unit whose position is known in a grid of hyperbolic time difference relationships including multiple ground stations which together with said fixed unit comprise the foci of said hyperbolic relationships and said ground stations having clocks synchronized with a common time base and these stations and the fixed unit being coupled to a common computer, including the steps of navigating at least one mobile unit within said grid and in direct communication with said ground stations and said fixed unit; transmitting pulse signals from said mobile unit and receiving said pulse signals at said ground stations and said fixed unit; computer calculating the location of said mobile unit in said hyperbolic grid using the differences in times of arrival of its pulse signals at said ground stations; computer-calculating the time with reference to said common time base when the mobile unit transmitted its signals and the arrival time thereof at said fixed unit; and correcting the fixed unit clock to remove the difference between said calculated arrival time and the time according to the clock at the fixed unit when said signals arrived.

* * * * *